US009322076B2

(12) United States Patent
Fraser et al.

(10) Patent No.: US 9,322,076 B2
(45) Date of Patent: Apr. 26, 2016

(54) METHOD AND APPARATUS FOR TEMPERATURE CONTROL IN A REACTOR VESSEL

(75) Inventors: Kevin S. Fraser, Mississauga (CA); Murray S. Pearson, Oakville (CA); William E. McCombe, Georgetown (CA)

(73) Assignee: HATCH LTD., Mississauga, Ontario (CA)

( * ) Notice: Subject to any disclaimer, the term of this patent is extended or adjusted under 35 U.S.C. 154(b) by 785 days.

(21) Appl. No.: 13/009,223

(22) Filed: Jan. 19, 2011

(65) Prior Publication Data
US 2011/0143296 A1    Jun. 16, 2011

Related U.S. Application Data

(63) Continuation of application No. PCT/CA2008/001376, filed on Jul. 24, 2008.

(51) Int. Cl.
| | | |
|---|---|---|
| F24J 3/00 | (2006.01) | |
| G05D 23/00 | (2006.01) | |
| C22B 3/02 | (2006.01) | |
| C22B 3/00 | (2006.01) | |
| F27D 19/00 | (2006.01) | |
| F27B 15/18 | (2006.01) | |
| F27B 15/00 | (2006.01) | |
| C01G 5/00 | (2006.01) | |
| C01G 7/00 | (2006.01) | |
| C22B 3/04 | (2006.01) | |
| G05D 23/13 | (2006.01) | |
| G05D 23/19 | (2006.01) | |

(52) U.S. Cl.
CPC ... *C22B 3/02* (2013.01); *C22B 3/04* (2013.01); *F27B 15/18* (2013.01); *F27D 19/00* (2013.01); *G05D 23/1393* (2013.01); *G05D 23/1931* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 2,448,922 A | * | 9/1948 | Eastwood et al. | 208/166 |
| 2,503,202 A | * | 4/1950 | Happel et al. | 422/607 |
| 2,503,703 A | * | 4/1950 | Bergstrom | 422/216 |
| 2,666,734 A | * | 1/1954 | Findlay | 196/120 |
| 2,685,498 A | * | 8/1954 | Dickinson | 208/159 |
| 2,755,232 A | * | 7/1956 | Dougherty | 208/78 |
| 3,041,058 A | * | 6/1962 | Straumann et al. | 266/96 |
| 3,092,471 A | * | 6/1963 | Stromeyer | 34/371 |
| 3,172,880 A | * | 3/1965 | Lupfer | 526/61 |
| 3,294,773 A | * | 12/1966 | Gans et al. | 526/61 |
| 3,423,840 A | * | 1/1969 | Beeken | 34/369 |
| 3,464,914 A | * | 9/1969 | Weekman, Jr. | B01J 8/001 208/159 |

(Continued)

*Primary Examiner* — Gregory Huson
*Assistant Examiner* — Eric Gorman
(74) *Attorney, Agent, or Firm* — K&L Gates LLP

(57) ABSTRACT

A method and apparatus for controlling a temperature within a reactor vessel such as an autoclave operating at elevated temperature and pressure. The apparatus includes a preheating vessel for preheating a feed material such as an aqueous slurry. The preheating vessel forms part of a preheating control system providing the primary means of temperature control within the reactor vessel. The apparatus also comprises secondary means for heating and cooling the reactor. Feed material temperature is increased or decreased by the preheating control system, based on the reactor temperature. Where the preheating control system is at or near its capacity for heating or cooling, the secondary heating or cooling means is activated to bring the reactor temperature within an optimum range.

16 Claims, 3 Drawing Sheets

(56) References Cited

U.S. PATENT DOCUMENTS

| | | | | |
|---|---|---|---|---|
| 3,506,715 A | * | 4/1970 | Clark | 568/72 |
| 3,547,758 A | * | 12/1970 | Ebigt et al. | 428/213 |
| 3,549,351 A | * | 12/1970 | Lundquist | C21B 13/00 422/233 |
| 3,647,758 A | * | 3/1972 | Ryffel et al. | 526/64 |
| 3,649,202 A | * | 3/1972 | Bajek et al. | 422/62 |
| 3,728,239 A | * | 4/1973 | McDonald | 208/150 |
| 3,751,229 A | * | 8/1973 | Bajek et al. | 422/62 |
| 3,972,804 A | * | 8/1976 | McLaughlin et al. | 208/108 |
| 3,974,064 A | * | 8/1976 | Bajek et al. | 208/134 |
| 3,979,183 A | * | 9/1976 | Scott | 422/109 |
| 3,981,792 A | * | 9/1976 | Scott | 208/49 |
| 4,018,588 A | * | 4/1977 | Hardy, Jr. | 65/19 |
| 4,093,537 A | * | 6/1978 | Gross et al. | 208/164 |
| 4,140,583 A | * | 2/1979 | Halligan | C07C 1/00 201/34 |
| 4,157,245 A | * | 6/1979 | Mitchell et al. | 48/197 R |
| 4,211,636 A | * | 7/1980 | Gross et al. | 208/164 |
| 4,282,084 A | * | 8/1981 | Gross et al. | 208/113 |
| 4,374,092 A | * | 2/1983 | Marquess et al. | 422/199 |
| 4,404,180 A | * | 9/1983 | Drum et al. | 423/563 |
| 4,455,282 A | * | 6/1984 | Marquess et al. | 422/199 |
| 4,526,731 A | * | 7/1985 | Henderson | 264/5 |
| 4,539,917 A | * | 9/1985 | Mallon et al. | 110/256 |
| 4,543,058 A | * | 9/1985 | Petersen | 432/9 |
| 4,552,725 A | * | 11/1985 | Audeh | 422/140 |
| 4,568,258 A | * | 2/1986 | Henderson | 425/10 |
| 4,606,763 A | | 8/1986 | Weir | |
| 4,626,258 A | * | 12/1986 | Koppelman | 201/34 |
| 4,728,339 A | * | 3/1988 | Koppelman | 44/492 |
| 4,812,117 A | * | 3/1989 | Granstrom | 432/9 |
| 4,910,684 A | * | 3/1990 | Ostergaard et al. | 700/274 |
| 4,965,232 A | * | 10/1990 | Mauleon | C10G 11/182 208/113 |
| 5,038,852 A | * | 8/1991 | Johnson et al. | 165/267 |
| 5,250,273 A | | 10/1993 | Hornsey et al. | |
| 5,251,684 A | * | 10/1993 | Andrews et al. | 164/456 |
| 5,268,018 A | * | 12/1993 | Mourer et al. | 75/338 |
| 5,277,869 A | * | 1/1994 | Glazer et al. | 422/26 |
| 5,460,642 A | * | 10/1995 | Leland | 75/617 |
| 5,590,479 A | * | 1/1997 | Ruf et al. | 34/587 |
| 5,669,317 A | * | 9/1997 | May et al. | 110/229 |
| 6,110,255 A | * | 8/2000 | Williams et al. | 75/744 |
| 6,461,573 B1 | * | 10/2002 | Yamamoto et al. | 422/109 |
| 6,945,775 B2 | * | 9/2005 | Fraser et al. | 432/95 |
| 7,842,265 B1 | * | 11/2010 | Paone, III | 423/210 |
| 2003/0031604 A1 | * | 2/2003 | Brooks et al. | 422/106 |
| 2003/0181760 A1 | * | 9/2003 | Nakajima | B01J 19/0013 562/519 |
| 2004/0082824 A1 | * | 4/2004 | Lattner | 585/638 |
| 2004/0142222 A1 | * | 7/2004 | Yang et al. | 429/26 |
| 2004/0238654 A1 | * | 12/2004 | Hagen et al. | 237/12.1 |
| 2005/0074380 A1 | * | 4/2005 | Boren et al. | 423/1 |
| 2007/0175825 A1 | * | 8/2007 | Denney | C02F 3/34 210/631 |
| 2007/0199903 A1 | * | 8/2007 | Denney | B01D 21/0024 210/723 |
| 2007/0218541 A1 | * | 9/2007 | Denney | C02F 1/008 435/267 |
| 2007/0221552 A1 | * | 9/2007 | Denney | B01D 21/0093 210/85 |
| 2007/0227971 A1 | * | 10/2007 | Denney | C02F 1/5236 210/606 |
| 2007/0234702 A1 | * | 10/2007 | Hagen et al. | 60/39.01 |
| 2008/0192879 A1 | * | 8/2008 | Ishii | G21C 7/36 376/247 |
| 2008/0213716 A1 | * | 9/2008 | Koyama et al. | 432/1 |
| 2008/0262173 A1 | * | 10/2008 | Van Nuland et al. | 526/73 |

* cited by examiner

METHOD AND APPARATUS FOR TEMPERATURE CONTROL IN A REACTOR VESSEL

CROSS-REFERENCE TO RELATED APPLICATION

This application is a continuation of International Application No. PCT/CA2008/001376, filed on Jul. 24, 2008, now pending.

FIELD OF THE INVENTION

The invention relates to temperature control of reactor vessels used in metallurgical processes.

BACKGROUND OF THE INVENTION

Some metallurgical processes involve the treatment of aqueous slurries containing solid, metal-containing particles. In one example of a metallurgical process, an aqueous slurry of a mineral or metal-containing compound is subjected to leaching or oxidation at elevated temperatures and pressures in an autoclave. In order to maximize the efficiency of the leaching or oxidation process, it is preferred to preheat the slurry before feeding it to the autoclave. For this purpose, a preheating vessel is provided upstream of the autoclave. Inside the preheating vessel the slurry is preheated to within a narrow temperature range by contact with a heating medium such as steam generated by an autoclave flashing process.

Typically the slurry is preheated by controlling the flash steam pressure in the apparatus, i.e. by venting, but precise control of the slurry temperature is difficult to achieve in this manner. An improved method and apparatus for preheating slurry is described in U.S. Pat. No. 6,945,775, issued on Sep. 20, 2005 to Fraser et al., in which the temperature of the slurry in the preheating vessel is accurately controlled by heating a first portion of the slurry in the preheating vessel and adding to it a second portion of slurry at lower temperature.

The temperature of the slurry is only one factor influencing the operating temperature within the autoclave. Even with accurately controlled preheating, the slurry discharged from the preheating vessel may be either too hot or too cool for optimal and efficient operation of the metallurgical process inside the autoclave. Under these conditions, it may be necessary to provide auxiliary heating or cooling to ensure that the desired process conditions are met.

SUMMARY OF THE INVENTION

In an embodiment of the invention, a method is provided for controlling the temperature within a reactor vessel. The method includes the steps of preheating at least a portion of the feed material with a first heating medium in a heating section of a preheating vessel; discharging the feed material from an outlet of the preheating vessel to an inlet of the reactor vessel; sensing the temperature within the reactor vessel; and determining whether the temperature within the reactor vessel is to be increased or decreased.

If it is determined that the temperature within the reactor vessel is to be increased, the method also includes increasing the preheating of the feed material by an amount sufficient to increase a temperature at which the feed material enters the reactor vessel. Alternatively, where the preheating of the feed material has been increased to a maximum level, then an amount of a second heating medium is supplied to the reactor vessel sufficient to increase the temperature within the reactor vessel.

If, on the other hand, it is determined that the temperature within the reactor vessel is to be decreased, the method also includes decreasing the preheating of the feed material by an amount sufficient to decrease a temperature at which the feed material enters the reactor vessel. Alternatively, where the preheating of the feed material has been decreased to a minimum level, then an amount of a cooling medium is supplied to the reactor vessel sufficient to decrease the temperature within the reactor vessel.

In an embodiment of the invention, the preheating of the feed material is increased or decreased by increasing or decreasing an amount of the feed material which at least partially bypasses the heating section of the preheating vessel.

In an embodiment of the invention, the maximum level of preheating is reached when the amount the feed material which at least partially bypasses the heating section is at or near a minimum amount. Conversely, the minimum level of preheating is reached when the amount of the feed material which at least partially bypasses the heating section is at or near a maximum amount.

In an embodiment of the invention, the preheating is increased or decreased by operation of a bypass control valve which controls the amount of the feed material which at least partially bypasses the heating section.

In an embodiment of the invention, the minimum level of preheating and the maximum level of preheating correspond to configurations of the bypass control valve or the flow rate of the feed material through the valve. For example, the minimum level of preheating may correspond to a configuration of the bypass control valve whereby the valve is from about 90 to 100 percent open, and the maximum level of preheating corresponds to a configuration of the bypass control valve whereby the valve is from 0 to about 10 percent open.

In an embodiment of the invention, the reactor vessel is an autoclave operating at elevated temperature and pressure, the feed material is an aqueous slurry of minerals or metal-containing compounds to be oxidized or leached inside the autoclave, the first heating medium is steam, the cooling medium is an aqueous medium, and the second heating medium is steam and/or a reagent which reacts exothermically with the minerals or metal-containing compounds of the slurry.

In an embodiment of the invention, an apparatus is provided for controlling a temperature within a reactor vessel. The apparatus includes a preheating control system for preheating a feed material. The preheating control system comprises a preheating vessel having a first inlet for receiving at least a portion of the feed material, an outlet for discharging the feed material to the reaction vessel, and a second inlet for receiving a first heating medium. The apparatus also includes a temperature sensing device for measuring the temperature within the reactor vessel and generating a corresponding reactor temperature signal. The apparatus also includes a reactor heating control system for supplying a controlled amount of a second heating medium to the reactor vessel to increase the temperature within the reactor vessel, and a reactor cooling control system for supplying a controlled amount of a cooling medium to the reactor vessel to decrease the temperature within the reactor vessel. The apparatus also includes a controller which receives the reactor temperature signal and which is programmed to determine whether the temperature within the reactor vessel is to be increased or decreased.

Where the temperature within the reactor vessel is to be increased, the controller is programmed to control the operation of the preheating control system so as to increase the temperature at which the feed material is discharged, and is programmed to control the operation of the reactor heating control system to supply the second heating medium to the reactor vessel in an amount sufficient to increase the temperature within the reactor vessel.

Where the temperature within the reactor vessel is to be decreased, the controller is programmed to control the operation of the preheating control system so as to decrease the temperature at which the feed material is discharged, and is programmed to control the operation of the reactor cooling control system to supply the cooling medium to the reactor vessel in an amount sufficient to decrease the temperature within the reactor vessel.

In an embodiment of the invention, the preheating vessel comprises a heating section in which the feed material entering the preheating vessel through the first inlet is heated by contact with the first heating medium, and a collection section downstream of the heating section. In this embodiment, the feed material heated in the heating section is collected in the collection section and the outlet is adjacent to the collection section.

In an embodiment of the invention, the preheating vessel further comprises a third inlet for receiving at least a portion of said feed material. In this embodiment, the preheating control system further comprises a preheating control valve which is located upstream of the preheating vessel. The preheating control valve has an inlet to receive at least a portion of the feed material and an outlet in flow communication with the third inlet of the preheating vessel. The preheating control valve is operable to adjust the relative proportions of the feed material entering the preheating vessel through the first and third inlets; wherein the first inlet is located relative to the heating section such that the feed material entering the preheating vessel through the first inlet is heated by contact with the first heating medium. The third inlet is located relative to the heating section such that the feed material entering the preheating vessel through the third inlet at least partially bypasses the heating section. The controller is programmed to control the operation of the preheating control valve in response to said reactor temperature signal.

In an embodiment of the invention, the preheating control system further comprises a preheating control valve sensor which senses a configuration of the preheating control valve relative to a first configuration in which the amount of the feed material entering the preheating vessel through the first inlet is at a maximum and relative to a second configuration in which an amount of the feed material entering the preheating vessel through the third inlet is at a maximum.

In an embodiment of the invention, the controller is programmed to control the reactor cooling control system and cause it to supply the cooling medium to the reactor vessel in an amount sufficient to decrease the temperature within the reactor vessel when the amount of the feed material entering the preheating vessel through the third inlet is at a maximum.

In an embodiment of the invention, the controller is programmed to control the reactor heating control system and cause it to supply the second heating medium to the reactor vessel in an amount sufficient to increase the temperature within the reactor vessel when the amount of the feed material entering the preheating vessel through the first inlet is at a maximum.

In an embodiment of the invention, the reactor heating control system comprises a second heating medium control valve for controlling a flow of the second heating medium into the reactor vessel, wherein the controller is programmed to control the operation of the second heating medium control valve in response to the reactor temperature signal.

In an embodiment of the invention, the reactor cooling control system comprises a cooling medium control valve for controlling a flow of the cooling medium into the reactor vessel, wherein the controller is programmed to control the operation of the cooling medium control valve in response to the reactor temperature signal.

In an embodiment of the invention, the temperature sensing device measures the reaction temperature within a first chamber of the autoclave.

In an embodiment of the invention, the first heating medium is steam and the preheating control valve controls the pressure of the steam within the preheating vessel between a maximum steam pressure and a minimum steam pressure.

BRIEF DESCRIPTION OF THE DRAWINGS

The invention will now be described, by way of example only, with reference to the accompanying drawings in which.

DETAILED DESCRIPTION

Specific embodiments of a method and apparatus according to the invention are now described with reference to the drawings. The embodiments described herein relate specifically to processes in which a feed material comprising an aqueous slurry of minerals or metal-containing compounds is oxidized or leached inside an autoclave operating at elevated temperature and pressure. It will be appreciated, however, that the method and apparatus according to the invention can be applied to other types of processes in which a feed material is preheated in a preheating vessel before being reacted in a reactor vessel.

Figure 1:
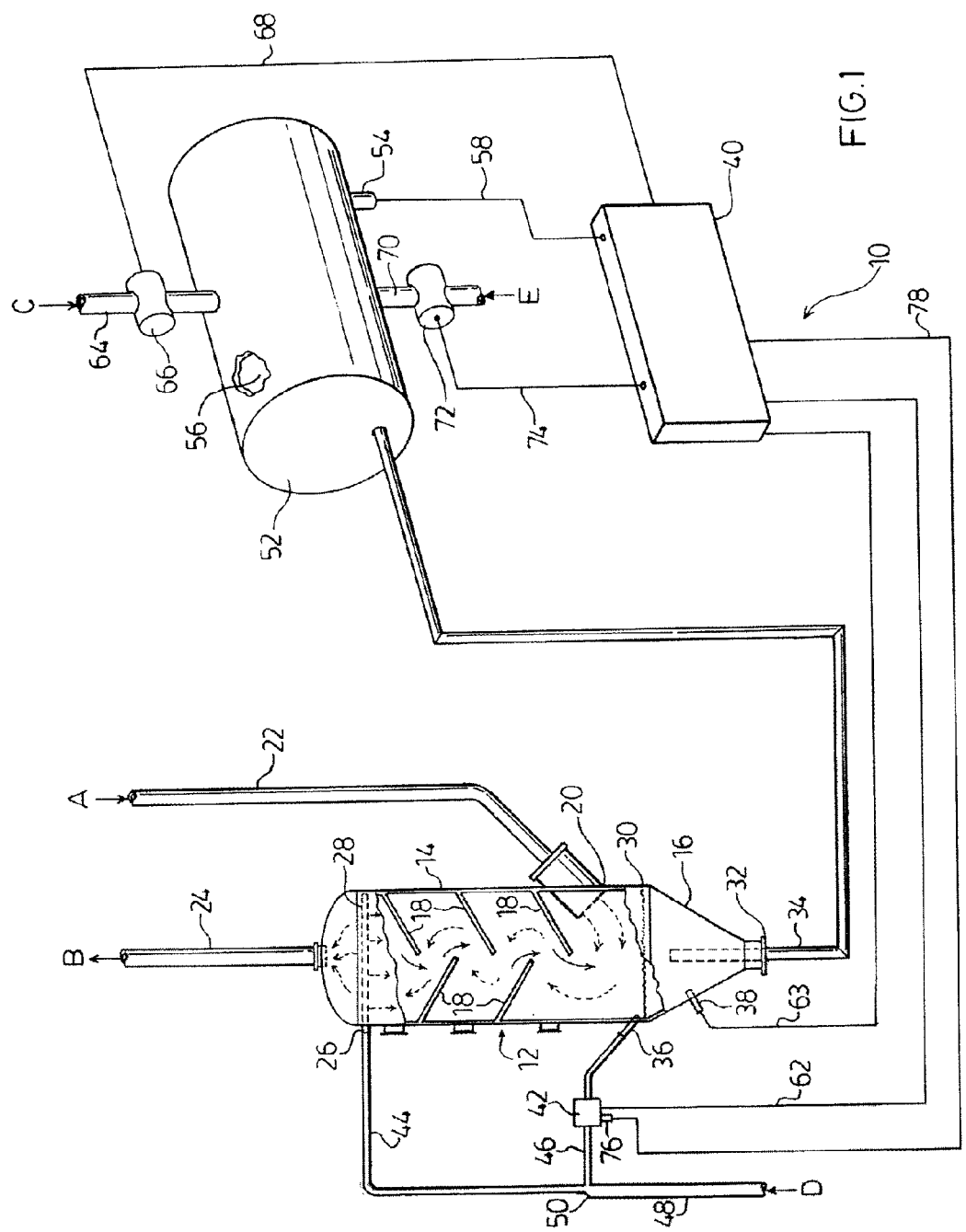
FIG. 1 is a schematic view of an apparatus according to an embodiment of the present invention.

An embodiment of an apparatus 10 according to the invention is now described below with reference to FIG. 1. It will be appreciated that the components of apparatus 10 shown in FIG. 1 in a greatly simplified form so as to show only those elements which are necessary for an understanding of the invention.

The apparatus 10 includes a preheating control system, one component of which is a preheating vessel 12. The preheating vessel 12 described herein is similar to that described in above-mentioned U.S. Pat. No. 6,945,775 to Fraser et al., which is incorporated herein by reference in its entirety.

The preheating vessel 12 comprises a slurry heating section 14 and a slurry collection section 16 which is located downstream of the heating section 14. In the specific embodiment shown in FIG. 1, the heating section 14 and collection section 16 are arranged vertically relative to one another with the heating section 14 being located in an upper portion of preheating vessel 12 and the collection section 16 being located in a lower portion of preheating vessel 12.

The slurry heating section 14 preferably comprises a plurality of baffles 18 projecting inwardly from the walls of preheating vessel 12, and angled downwardly toward the collection section 16. A heating medium for heating the slurry enters the preheating vessel 12 through a heating medium inlet 20. The heating medium is preferably a gas, most preferably steam which is generated by an autoclave flashing process. The steam flows in the direction of arrow A through a pipe 22 which carries the heating medium to the inlet 20. As shown in the drawing, the heating medium is fed into the preheating vessel 12 downstream of heating section 14, preferably being located below the lowermost baffle 18. The gaseous heating medium then flows upwardly through the heating vessel 12, around baffles 18, and exits the vessel 12 in the direction of arrow B through a vent pipe 24.

A first portion of the slurry enters the preheating vessel 12 through a first slurry inlet 26. The first portion of the slurry is then pumped through a perforated pipe 28 within the preheating vessel 12, and is sprayed from the perforations in the pipe into the interior of the preheating vessel 12. The first portion of the slurry then passes downwardly by gravity through the heating section 14 of vessel 12, passing down across the surfaces of the baffles 18 in the direction of the solid arrows shown inside the vessel 12. As the first portion of the slurry passes downwardly through heater section 14, it is brought into contact with the heating medium rising upwardly through the vessel 12 in the direction of the dashed arrows, thereby increasing the temperature of the slurry.

The preheating vessel 12 further comprises a second slurry inlet 36 through which a second portion of the slurry enters the vessel 12. The second slurry inlet 36 is located relative to heating section 14 such that a temperature of the second portion of the slurry entering the collection section 16 is lower than a temperature at which the first portion of the slurry enters the collection section 16. In other words, the second slurry inlet 36 is located such that the second portion of the slurry bypasses at least a portion of the heating section 14, thereby ensuring that the second portion of the slurry is at a lower temperature than the first portion of the slurry when it enters the collection section 16. Most preferably, as shown in FIG. 1, the second slurry inlet 36 is located downstream of the heating section 14, below the lowermost baffle 18, such that the second portion of the slurry flows directly into the collection section 16 without passing through the heating section 14.

The first and second portions of the slurry are combined and collected in collection section 16 so as to provide a mixed slurry, ready for discharge, which is at a temperature less than that of the first portion of the slurry and greater than that of the second portion of the slurry. The approximate level of the collected slurry inside section 16 is designated as numeral 30. A slurry outlet 32 for discharge of the slurry is provided adjacent the slurry collection section 16, and is preferably provided at the lower end thereof. The preheated slurry is discharged from outlet 32 and pumped through a pipe 34 toward an inlet of the reactor vessel 52.

The preheating control system also includes a preheating control valve 42 which controls the relative amounts of the slurry entering the preheating vessel 12 through inlets 26 and 36. The operation of the valve 42 is controlled by a programmed electronic controller 40, as further described below, and communication between the controller 40 and valve 42 may be provided through an electrical wire 62. The controller 40 controls the operation of valve 42 so as to regulate the flow of the second portion of the slurry through the inlet 36. When the temperature of the slurry collected in the collection section 16 exceeds a predetermined temperature, the flow of slurry entering the preheating vessel 12 through inlet 36 is increased to lower the temperature of the slurry in the collection section 16. Conversely, when the temperature of the slurry in the collection section is less than the predetermined temperature, addition of the second portion of the slurry to the preheating vessel 12 is reduced or discontinued. It will be appreciated that the preheating of the slurry is maximized when the preheating control valve 42 is completely closed, so that none of the slurry bypasses the heating section 14 of the preheating vessel 12. Conversely, the preheating is minimized when the preheating control valve 42 is completely open and the amount of the slurry which bypasses the heating section 14 is at a maximum.

The predetermined temperature setpoints at which the control valve 42 alters the flow of slurry are based on the temperature within the reactor vessel 52. The apparatus 10 further includes a temperature sensing device 54 for monitoring the temperature within the reactor vessel 52. Where the reactor vessel 52 is an autoclave comprising a number of chambers, the temperature sensing device 54 may preferably monitor the temperature within a first chamber 56 of the reactor vessel 52. The temperature sensing device 54 may include one or more sensors so as to measure the temperature at one or more specific locations within the reactor vessel 52, and may calculate an average temperature within the reactor vessel 52. For simplicity, the temperature sensing device 54 is described herein as comprising a single sensor for monitoring the temperature at a single location within the reactor vessel 52. The temperature within reactor vessel 52 may be monitored continuously or periodically.

The temperature sensing device 54 generates a reactor temperature signal corresponding to the measured temperature within reactor vessel 52 and transmits the reactor temperature signal to the controller 40, for example through an electrical wire 58. The controller 40 receives the reactor temperature signal and is programmed to use this signal for determining whether or not the temperature within reactor vessel 52 is within acceptable limits, or whether the temperature needs to be increased or decreased. For example, the controller 40 may be programmed to compare the measured temperature within reactor vessel 52 with a temperature or a temperature range at which the operation of the process within reactor vessel 52 is optimal.

The preheating control system may also include at least one temperature sensor 38 for monitoring the temperature of the slurry in the collection section 16 on a continuous or periodic basis. Temperature data collected by the at least one temperature sensor 38 may be transmitted to controller 40 through an electrical wire 63.

The preheating control valve 42 may be of a type which is designed for handling abrasive slurries, and which is capable of adjusting the flow of slurry to the preheating vessel 12. That is, the flow of slurry through the valve may be controllable between a zero flow rate and a maximum flow rate, thereby providing precise control over the temperature of the slurry within preheating vessel 12. Furthermore, it may be preferred to maintain a continuous, variable flow of slurry through valve 42. A specific example of a valve 42 is the Valtek® Survivor™ control valve. Such valves have a sweep angle design to provide high flow capacity while minimizing impingement of particles on the valve body; ceramic trim to protect the valve from erosion; wiper rings to provide longer packing life; a clamped seat design to minimize erosion, simplify maintenance and provide high flow capacity; and an extended-venturi seat design to protect the valve body from erosive damage.

In an embodiment of the invention, the first portion of the slurry 26 is pumped continuously into preheating vessel 12 through inlet 26, the heating medium is continuously fed into preheating vessel 12 through inlet 20, and the heated slurry collected in collection section 16 is continuously pumped from the preheating vessel 12 through outlet 32. The second portion of the slurry is added to the preheating vessel 12 intermittently or continuously in order to control the temperature of the slurry in collection section 16. In the embodiment shown in FIG. 1, the first and second portions of the slurry are delivered to respective inlets 26, 36 through pipes 44, 46, with the valve 42 being located in pipe 46 through which the second portion of the slurry is pumped to the second inlet 36.

The first and second portions of the slurry may originate from the same source, with the combined slurry being pumped in the direction of arrow D through a pipe 48 having a branch at 50 which divides the flow of slurry into pipes 44 and 46. It will be appreciated that the location of valve 42 in pipe 46 is not essential, and that valve 42 may instead be a three-way valve located at branch 50. It will also be appreciated that the specific arrangement shown in FIG. 1 by which the second portion of the slurry at least partially bypasses the heating section 14 is not essential. For example, it will be appreciated that the second portion of the slurry may bypass the preheating vessel 12 entirely and may instead be added to the process at a point downstream of the preheating vessel 12, for example directly into pipe 34 or alternatively into reactor vessel 52.

Primary temperature control within the reactor vessel 52 is provided by, the preheating control system, described above, which controls and adjusts the temperature at which the slurry is discharged to the reactor vessel 52 and thereby controls the reactor temperature. Under some process conditions, however, the heating or cooling needs of the reactor vessel 52 may exceed the capacity of the preheating vessel 12 and the preheating control system to increase or decrease the temperature within the reactor vessel 52 through temperature control of the slurry alone. In order to effectively control the temperature within the reactor vessel 52 under these conditions, the apparatus 10 also includes secondary means for heating and cooling the reactor vessel 52. In the embodiment described herein, the secondary heating and cooling means comprise a reactor heating control system and a reactor cooling control system, which are now described below.

The reactor cooling control system controls the supply of a cooling medium to decrease the temperature within the reactor vessel 52. In the embodiment described herein, the cooling medium may comprise an aqueous medium, such as liquid water or any other process stream that has cooling capacity, i.e. is at a lower temperature than the reactor temperature. Suitable cooling media include, without restriction, reclaimed (runoff) water or other aqueous process streams which may contain impurities such as acid and copper, such as raffinate from a solvent extraction, electrowinning plant. The cooling medium is added directly to the reactor vessel 52 in the direction of arrow C through a conduit 64. The reactor cooling control system comprises a cooling medium control valve 66 for controlling the flow of the cooling medium into the reactor vessel 52. The operation of the cooling medium control valve 66 is controlled by controller 40, and communication between controller 40 and valve 66 may be provided through electrical wire 68.

The reactor heating control system controls the supply of a secondary heating medium to increase the temperature within the reactor vessel 52. In the embodiment described herein, the secondary heating medium may comprise steam and/or a reagent which reacts exothermically with the minerals or metal-containing compounds contained in the slurry. Where the reaction within the reactor vessel 52 is an oxidation, the reagent used as the second heating medium may be oxygen. The secondary heating medium may be added directly to the reactor vessel 52 in the direction of arrow E through a conduit 70. The reactor heating control system comprises a heating medium control valve 72 for controlling the flow of the secondary heating medium into the reactor vessel 52. The operation of the heating medium control valve 72 is controlled by controller 40, and communication between controller 40 and valve 72 may be provided by electrical wire 74.

As described above, the controller 40 is programmed to control the primary means for reactor temperature control, i.e. the preheating control system which indirectly controls the reactor temperature by controlling the preheating of the slurry. The controller 40 is also programmed to control the secondary means for reactor temperature control, namely the secondary heating and cooling systems, which directly control the reactor temperature by adding a cooling medium or a secondary heating medium to the reactor vessel 52. Furthermore, the temperature within the reactor vessel 52 is used as the set point for the primary and secondary temperature control means.

Because a single controller 40 is programmed for control of both the primary and secondary means for reactor temperature control, and because the temperature within the reactor vessel 52 is used as the set point for the primary and secondary means for reactor temperature control, the present invention improves efficiency by ensuring that the primary and secondary means for reactor temperature control work together in a cooperative manner to maintain the temperature within the reactor vessel 52 at an optimal level. In prior art systems where the preheating control system is operated independently of the reactor heating and cooling systems, situations may arise where the temperature of the slurry supplied to the reactor vessel is not optimal, with the result that significant secondary heating or cooling of the reactor vessel 52 may be required. With the method and apparatus according to the invention secondary cooling and heating are rendered unnecessary under a wide range of process conditions because the temperature of the slurry is adjusted for optimal operation of the process within the reactor vessel 52, thus saving energy.

As mentioned above, the capacity of the preheating control system to regulate the reactor temperature through slurry preheating is limited. That is, the maximum preheating capacity is reached when the preheating control valve 42 is completely closed so that all of the slurry is preheated in heating section 14, and the minimum preheating capacity is reached when the preheating control valve 42 is completely open so that the amount of slurry bypassing heating section 14 is at a maximum. Within these limits, the primary reactor temperature control means is usually effective to control the reactor temperature without assistance from the secondary heating and cooling means. Once these limits have been reached, however, the controller is programmed to activate secondary heating or cooling means to adjust the reactor temperature as needed.

It may also be desirable to program the controller 40 so that it activates the secondary heating or cooling means within predetermined limits which are inside the capacity limits of the primary reactor temperature control means. These predetermined limits are selected such that the secondary heating or cooling means are activated before the preheating control valve 42 reaches its fully open or fully closed state. The predetermined limits may be based on specific valve configurations within the range between the fully closed and fully open states. For example, the controller 40 may be programmed to activate the reactor heating control system so as to increase the reactor temperature once the preheating control valve 42 is within 0-10% of its fully closed state, as determined by open area of the valve 42 or by the volume of flow through the valve 42. Similarly the controller 40 may be programmed to activate the reactor cooling control system so as to decrease the reactor temperature once the preheating control valve 42 is within 0-10% of its fully open state, as determined by open area of the valve 42 of by the volume of flow through the valve 42. In an embodiment of the invention, the controller 40 is programmed to activate the reactor cooling control system when the preheating control valve 42 has reached about 5% or less of its fully open state, and the controller 40 activates the reactor heating control system when the preheating control valve 42 has reached about 95% or more of its fully open state.

In order that the controller 40 may control the operation of preheating control valve 42, the apparatus 10 further comprises means for determining and monitoring the configuration of valve 42, i.e. the degree by which it is open. For example, the apparatus 10 may include a valve position sensor 76 which senses the configuration of the preheating control valve 42 relative to the predetermined limits and/or the fully opened or closed configurations of the valve 42. For example, the valve position sensor 76 may sense the position of a movable valve element within the preheating control valve 42 or it may measure the flow of slurry through the valve 42. The valve position sensor 76 transmits a valve position signal to the controller 40, for example through a wire 78. The controller 40 is programmed to use the valve position signal, along with the temperature signal from the reactor 52, to determine when to supply secondary heating or cooling to the reactor 52.

Figure 2:
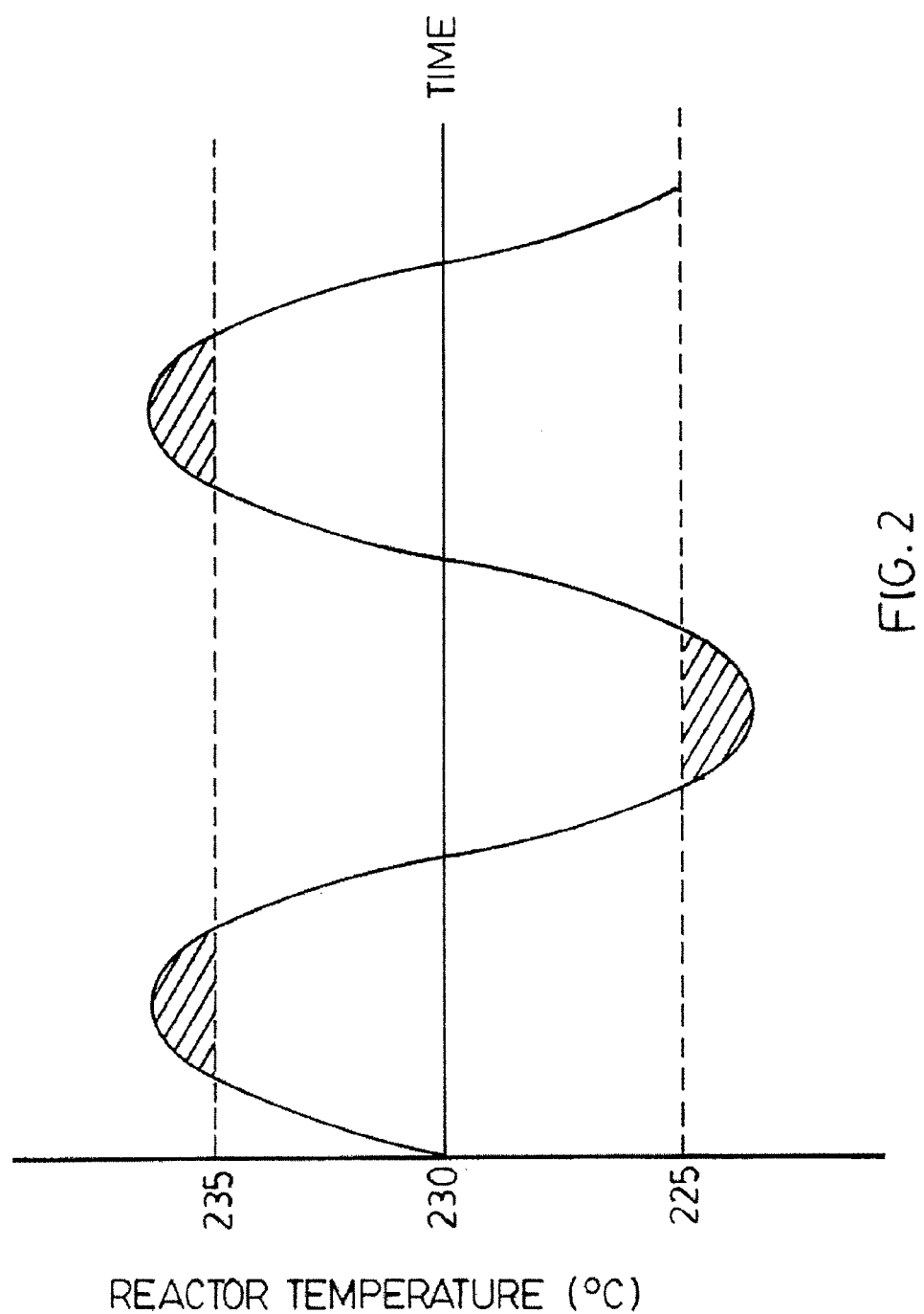
FIG. 2 is a graph of temperature versus time.

The invention is further illustrated by reference to FIG. 2, a graph of reactor temperature versus time. The reactor temperature is shown in FIG. 2 as fluctuating in relation to a first temperature setpoint of 230 degrees C. which represents an optimum reaction temperature. Some fluctuation from the optimal temperature is tolerable, and FIG. 2 shows two additional temperature setpoints, namely a high temperature setpoint of 235 degrees C. and a low temperature setpoint of 230 degrees C. These high and low temperature setpoints represent the approximate capacity of the preheating control system to control the reactor temperature by preheating of the slurry. That is, within the area bounded by the dotted lines at 225 and 235 degrees C., the preheating control system provides adequate control of the reactor temperature. In an embodiment of the invention, the high temperature setpoint of 235 degrees C. may correspond to a configuration of control valve 42 in which the valve is from about 90 to 100 percent closed or the flow of slurry through valve 42 is reduced to from 0 to about 10 percent of its maximum flow rate. The low temperature setpoint may correspond to a configuration of valve 42 in which the valve is from 0 to about 10 percent closed (i.e. from about 90 to 100 percent open), or where the flow of slurry through valve 42 is from about 90 to 100 percent of the maximum flow rate.

Where the reactor temperature exceeds the high or low temperature setpoints, represented by the hatched areas outside the dotted lines in FIG. 2, the preheating control system is at or near its capacity to further heat or cool the reactor 52, and therefore it is desirable to activate the secondary heating or cooling means when the reactor temperature rises above the high temperature setpoint or falls below the low temperature setpoint. It is desirable that the dotted lines representing the high and low temperature setpoints correspond closely to the maximum and minimum capacities of the preheating control system, in order to ensure that the preheating control system is adequate to heat and cool the reactor 52 over most process conditions, without activation of the secondary heating or cooling means.

Figure 3:
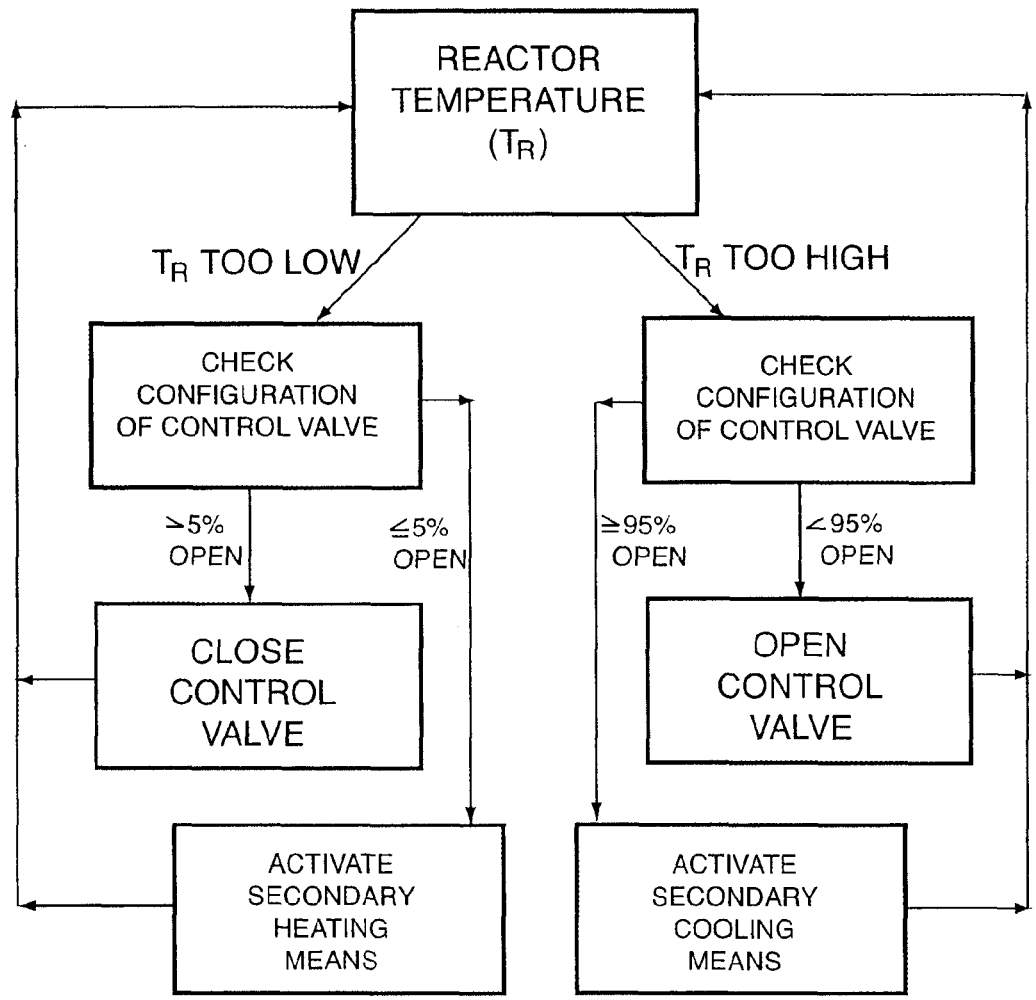
FIG. 3 is a flow chart showing the steps of a process according to an embodiment of the invention.

FIG. 3 is a flow chart showing the steps involved in the method described above. Firstly, the reactor temperature is monitored either continuously or periodically. When it is determined that the reactor temperature is too high or too low, the preheating control system is first checked to determine whether it is at or near its capacity to further heat or cool the reactor. In FIG. 3 the heating capacity limit is reached when the control valve is 5 percent open and the cooling capacity limit is reached when the control valve is 95 percent open. If it is determined that the control valve is between 5 to 95 percent open, then the control valve is either opened or closed by an amount which will bring about the desired increase or decrease in the reactor temperature. Where it is determined that the valve is ≤5 percent open or ≥95 percent open, then either the secondary heating means or the secondary cooling means is activated to bring about the desired increase or decrease in the reactor temperature. Although the embodiment described herein uses valve configuration or slurry flow through the valve 42 to determine when to activate the secondary heating or cooling systems, it will be appreciated that this is not essential. For example, the controller 40 may be programmed to use the temperature of the slurry within the collection section 16 of preheating vessel 12 as the basis for determining when to supply secondary heating or cooling to the reactor 52. For this purpose, the temperature signal sent to controller 40 from the temperature sensing device 38 located in the collection section 16 may be used as the basis for determining when the preheating vessel 12 is at or near the limits of its heating or cooling capacity, such that the primary heating or cooling provided by the preheating control system must be supplemented by the secondary heating or cooling means. It will be appreciated that the use of slurry temperature to determine whether to activate the secondary heating or cooling means may be less desirable than the use of valve configuration since a time lag may occur between a change in the position of preheating control valve 42 and a change in the slurry temperature in collection section 16.

The above description refers to activation of the secondary reactor heating and cooling means. It will be appreciated that the cooling medium and the secondary heating medium may be added to the reactor vessel 52 on a continuous or periodic basis for reasons other than temperature control, for example to replace reactants or solvents which may be consumed or vented during the reaction within vessel 52. Therefore, the activation of the secondary heating and cooling system is intended to include situations where the heating or cooling medium may be added throughout the process, but when the secondary heating or cooling system is activated the amount or rate of addition is increased so as to bring about a change in temperature within the reactor vessel 52. Where the cooling medium is liquid cooling water and the heating medium is steam, activation of the secondary reactor heating or cooling means involves adjusting the relative proportions of steam and liquid water so as to bring about a change in the temperature within the reactor vessel 52.

Although the invention has been described as including a preheating vessel 12 as described in U.S. Pat. No. 6,945,775 to Fraser et al., it will be appreciated that the use of this preheating vessel 12 is not essential for successful operation of the invention. Rather, the preheating vessel 12 may be replaced by a conventional preheating vessel in which preheating of the slurry is controlled by flash steam pressure in the apparatus. In this embodiment of the invention, the preheating control valve 42 would be situated in a vent and would control the steam pressure within the preheating vessel. As in the embodiment described above, maximum steam pressure and preheating are achieved with the control valve closed and minimum steam pressure and preheating are achieved with the control valve open.

Although the present invention has been described with reference to a preferred embodiment, it will be appreciated that the present invention is not limited thereto. Rather, the invention includes all embodiments which may fall within the scope of the following claims.

What is claimed is:

1. A method for controlling a temperature within a reactor vessel, comprising:
   (a) preheating at least a portion of a feed material with a first heating medium in a heating section of a preheating vessel, wherein the preheating vessel comprises:
      a first inlet adapted to receive at least a portion of the feed material;
      an outlet adapted to discharge the feed material to the reactor vessel;
      a second inlet adapted to receive the first heating medium;
      a heating section in which feed material entering said preheating vessel through said first inlet is heated by contact with the first heating medium, wherein said first inlet is located relative to said heating section such that feed material entering said preheating vessel through said first inlet is heated by contact with the first heating medium;
      a collection section downstream of said heating section, wherein feed material heated in said heating section is collected in said collection section, and wherein said outlet is adjacent to said collection section; and
   a third inlet adapted to receive at least a portion of the feed material, wherein said third inlet is located relative to said heating section such that feed material entering said preheating vessel through said third inlet at least partially bypasses said heating section;
   (b) discharging the feed material from an outlet of the preheating vessel to an inlet of the reactor vessel;
   (c) sensing the temperature within the reactor vessel with a temperature sensing device adapted to measure a temperature within the reactor vessel and generate a corresponding reactor temperature signal;
   (d) using a controller to determine whether the temperature within the reactor vessel is to be increased or decreased, wherein the controller is programmed to receive said reactor temperature signal and determine whether the temperature within the reactor vessel is to be increased or decreased, wherein:
      said controller is programmed to control the operation of a preheating control valve in response to said reactor temperature signal so as to increase or decrease the temperature at which the feed material is discharged, wherein the preheating control valve is located upstream of said preheating vessel, wherein said preheating control valve comprises an inlet adapted to receive at least a portion of the feed material and an outlet in flow communication with said third inlet of said preheating vessel, the preheating control valve being operable to adjust the relative proportions of feed material entering said preheating vessel through said first inlet and said third inlet;
      said controller is programmed to control the operation of a reactor heating control system to supply a second heating medium to the reactor vessel in an amount sufficient to increase the temperature within the reactor vessel, wherein the reactor heating control system is adapted to supply a controlled amount of the second heating medium to the reactor vessel to thereby increase the temperature within the reactor vessel; and
      said controller is programmed to control the operation of a reactor cooling control system to supply a cooling medium to the reactor vessel in an amount sufficient to decrease the temperature within the reactor vessel, wherein the reactor cooling control system is adapted to supply a controlled amount of the cooling medium to the reactor vessel to thereby decrease the temperature within the reactor vessel; and
   (e) where it is determined in step (d) that the temperature within the reactor vessel is to be increased:
      (i) increasing the preheating of the feed material by an amount sufficient to increase a temperature at which the feed material enters the reactor vessel; or
      (ii) where the preheating of the feed material has been increased to a maximum level, supplying the controlled amount of the second heating medium to the reactor vessel so as to increase the temperature within the reactor vessel;
   (f) where it is determined in step (d) that the temperature within the reactor vessel is to be decreased:
      (i) decreasing the preheating of the feed material by an amount sufficient to decrease a temperature at which the feed material enters the reactor vessel; or
      (ii) where the preheating of the feed material has been decreased to a minimum level, supplying the controlled amount of the cooling medium to the reactor vessel so as to decrease the temperature within the reactor vessel.

2. The method of claim 1, wherein the preheating of the feed material is increased or decreased by increasing or decreasing an amount of said feed material which at least partially bypasses the heating section of the preheating vessel.

3. The method of claim 2, wherein the maximum level of preheating is reached when the amount said feed material which at least partially bypasses the heating section is at or near a minimum amount.

4. The method of claim 2, wherein the minimum level of preheating is reached when the amount of said feed material which at least partially bypasses the heating section is at or near a maximum amount.

5. The method of claim 1, wherein the reactor vessel is an autoclave operating at elevated temperature and pressure, the feed material is an aqueous slurry of minerals or metal-containing compounds to be oxidized or leached inside the autoclave, the first heating medium is steam, the cooling medium is water, and the second heating medium is steam and/or a reagent which reacts exothermically with the minerals or metal-containing compounds of the slurry.

6. An apparatus for controlling a temperature within a reactor vessel, the apparatus comprising:
   (a) a preheating vessel comprising:
      a first inlet adapted to receive at least a portion of a feed material;
      an outlet adapted to discharge the feed material to the reactor vessel;
      a second inlet adapted to receive a first heating medium;
      a heating section in which feed material entering said preheating vessel through said first inlet is heated by contact with the first heating medium, wherein said first inlet is located relative to said heating section such that feed material entering said preheating vessel through said first inlet is heated by contact with the first heating medium;
      a collection section downstream of said heating section, wherein feed material heated in said heating section is collected in said collection section, and wherein said outlet is adjacent to said collection section; and
      a third inlet adapted to receive at least a portion of the feed material, wherein said third inlet is located relative to said heating section such that feed material entering said preheating vessel through said third inlet at least partially bypasses said heating section;

(b) a preheating control valve located upstream of said preheating vessel, wherein said preheating control valve comprises an inlet adapted to receive at least a portion of the feed material and an outlet in flow communication with said third inlet of said preheating vessel, the preheating control valve being operable to adjust the relative proportions of feed material entering said preheating vessel through said first inlet and said third inlet;

(c) a temperature sensing device adapted to measure a temperature within the reactor vessel and generate a corresponding reactor temperature signal;

(d) a reactor heating control system adapted to supply a controlled amount of a second heating medium to the reactor vessel to thereby increase the temperature within the reactor vessel;

(e) a reactor cooling control system adapted to supply a controlled amount of a cooling medium to the reactor vessel to thereby decrease the temperature within the reactor vessel; and (f) a controller programmed to: receive said reactor temperature signal; and determine whether the temperature within the reactor vessel is to be increased or decreased, wherein:

said controller is programmed to control the operation of said preheating control valve in response to said reactor temperature signal so as to increase or decrease the temperature at which the feed material is discharge;

said controller is programmed to control the operation of said reactor heating control system to supply the second heating medium to the reactor vessel in an amount sufficient to increase the temperature within the reactor vessel; and said controller is programmed to control the operation of said reactor cooling control system to supply the cooling medium to the reactor vessel in an amount sufficient to decrease the temperature within the reactor vessel.

7. The apparatus of claim 6, further comprising a preheating control valve sensor adapted to sense a configuration of said preheating control valve relative to a first configuration in which an amount of the feed material entering said preheating vessel through said first inlet is at a maximum and relative to a second configuration in which an amount of the feed material entering said preheating vessel through said third inlet is at a maximum.

8. The apparatus of claim 7, wherein said controller is programmed to control said reactor cooling control system and cause it to supply the cooling medium to the reactor vessel in an amount sufficient to decrease the temperature within the reactor vessel when the amount of the feed material entering said preheating vessel through said third inlet is at said maximum.

9. The apparatus of claim 7, wherein said controller is programmed to control said reactor heating control system and cause it to supply the second heating medium to the reactor vessel in an amount sufficient to increase the temperature within the reactor vessel when the amount of the feed material entering said preheating vessel through said first inlet is at said maximum.

10. The apparatus of claim 6, wherein said reactor heating control system comprises a second heating medium control valve adapted to control a flow of the second heating medium into said reactor vessel, wherein the controller is programmed to control the operation of said second heating medium control valve in response to said reactor temperature signal.

11. The apparatus of claim 6, wherein said reactor cooling control system comprises a cooling medium control valve for controlling a flow of said cooling medium into said reactor vessel, wherein said controller is programmed to control the operation of the cooling medium control valve in response to said reactor temperature signal.

12. The apparatus of claim 6, wherein the reactor vessel is an autoclave operating at elevated temperature and pressure, the feed material is an aqueous slurry of minerals or metal-containing compounds to be oxidized or leached inside the autoclave, the first heating medium is steam, the cooling medium is water, and the second heating medium is steam and/or a reagent which reacts exothermically with the minerals or metal-containing compounds of the slurry.

13. The apparatus of claim 12, wherein said temperature sensing device measures the reaction temperature within a first chamber of the autoclave.

14. The apparatus of claim 6, wherein said first heating medium is steam and said preheating control valve controls a pressure of said steam within said preheating vessel between a maximum steam pressure and a minimum steam pressure.

15. The apparatus of claim 10, further comprising a conduit through which the second heating medium is added to the reactor vessel.

16. The apparatus of claim 15, wherein the second heating medium comprises steam, oxygen, or a reagent which reacts exothermically with minerals or metal-containing compounds contained in a slurry contained in the reactor vessel.

* * * * *